United States Patent
Liu et al.

(10) Patent No.: US 8,735,013 B1
(45) Date of Patent: May 27, 2014

(54) METHODS FOR FABRICATING INORGANIC PROTON-CONDUCTING COATINGS FOR FUEL-CELL MEMBRANES

(75) Inventors: Ping Liu, Irvine, CA (US); Jocelyn Hicks-Garner, Venice, CA (US); Chaoyin Zhou, Chino Hills, CA (US); Adam F. Gross, Los Angeles, CA (US); John J. Vajo, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 446 days.

(21) Appl. No.: 12/471,380

(22) Filed: May 24, 2009

(51) Int. Cl.
*H01M 8/04* (2006.01)

(52) U.S. Cl.
USPC ........... 429/433; 429/485; 429/483; 429/488; 429/496

(58) Field of Classification Search
USPC .......................... 429/433, 485, 483, 488, 496
See application file for complete search history.

(56) References Cited

U.S. PATENT DOCUMENTS

| | | | | |
|---|---|---|---|---|
| 6,416,898 B1 * | 7/2002 | Ohzu et al. | ..................... | 429/492 |
| 6,977,009 B2 * | 12/2005 | Pan et al. | .......................... | 96/13 |
| 7,790,220 B2 * | 9/2010 | Ha et al. | ........................ | 427/115 |
| 2003/0232250 A1 * | 12/2003 | Nogami et al. | ................ | 429/313 |
| 2006/0078765 A1 * | 4/2006 | Yang et al. | ........................ | 429/12 |
| 2006/0194096 A1 * | 8/2006 | Valle et al. | ...................... | 429/42 |
| 2007/0059452 A1 * | 3/2007 | Debe et al. | ..................... | 427/402 |

FOREIGN PATENT DOCUMENTS

JP 2006092952 A * 4/2006
WO WO 2008075901 A1 * 6/2008

* cited by examiner

*Primary Examiner* — Melissa Stadler
(74) *Attorney, Agent, or Firm* — O'Connor & Company

(57) ABSTRACT

The present invention provides methods for fabricating a fuel cell membrane structure that can dramatically reduce fuel crossover, thereby improving fuel cell efficiency and power output. Preferred composite membrane structures include an inorganic layer situated between the anode layer and the proton-exchange membrane. The inorganic layer can conduct protons in unhydrated form, rather than as hydronium ions, which reduces fuel crossover. Some methods of this invention include certain coating steps to effectively deposit an inorganic layer on an organic proton-exchange membrane.

18 Claims, 5 Drawing Sheets

METHODS FOR FABRICATING INORGANIC PROTON-CONDUCTING COATINGS FOR FUEL-CELL MEMBRANES

FIELD OF THE INVENTION

The present invention generally relates to fuel cells and fuel cell membrane composite structures.

BACKGROUND OF THE INVENTION

Fuel-cell systems continue to offer much theoretical promise for the production of electricity. Proton exchange membrane (PEM) fuel cells have drawn much attention in the last decade, due to the potential for a high-efficiency and low-emission source of energy.

For many of the fuel-cell systems known in the art, the performance can be dramatically influenced by the PEM and its interaction with the fuel. Fuel permeability results in undesirable diffusion of the fuel from the anode to the cathode. For example, direct methanol fuel cells (DMFCs) currently suffer from fuel crossover, which limits the concentration of methanol that can be fed to the fuel cell. This limitation prevents the fuel cell from achieving higher current densities and power outputs due to poor utilization.

A DMFC feeds a methanol/water solution directly to the fuel cell (such as described in U.S. Pat. No. 5,599,638, for example). Nafion®, a perfluorinated sulphonic acid polymer, is often used as a PEM membrane material for fuel cells which operate at temperatures close to ambient. Nafion is typically employed as the PEM membrane in DMFCs. Other membranes of modified perfluorinated sulfonic acid polymers, polyhydrocarbon sulfonic acid polymers, and composites thereof, in addition to Nafion, are known.

The method of proton conduction in these systems requires that the membrane be hydrated, because protons are transported by the movement of hydronium ions ($H_3O^+$) through the membrane. The need for hydration often exacerbates the problem of fuel crossover, as PEM membranes are usually permeable to many fuels including methanol. When electric current flows through the fuel cell, the migrating hydronium will carry both water and the fuel (especially when it is highly miscible with water) across the membrane. The problem of fuel crossover limits the permissible fuel concentration.

Modification of the PEM membrane has been attempted to reduce the effect of crossover. One such system is described in U.S. Pat. No. 7,022,810 to Cornelius. In this patent, Cornelius describes a "hybrid inorganic-organic" membrane. Synthesis of the membrane is achieved by mixing an organic precursor of the proton-conducting polymer with an inorganic salt. The resulting membrane composition can be varied by altering the starting materials. These types of membranes reduce, but do not eliminate, fuel crossover while at the expense of proton conductivity which ultimately negatively impacts fuel cell performance.

There is a commercial need to reduce fuel crossover in fuel cells, thereby increasing fuel cell efficiency and power output. What is desired is an improved fuel cell, and methods to fabricate such a fuel cell, without chemical or physical modification to a desired PEM material itself. It would be further desirable for improved fuel cells to allow the use of fuels that would otherwise be incompatible with the desired PEM.

SUMMARY OF THE INVENTION

The present invention addresses the aforementioned needs in the art, as will now be summarized and further described in detail herein.

In some variations, this invention provides a method of fabricating a composite membrane structure for a fuel cell, the method comprising a coating step to deposit, such as from a liquid solution, a proton-conducting inorganic layer on an organic proton-exchange membrane. In preferred embodiments, the inorganic layer is substantially continuous with respect to the proton-exchange membrane. The inorganic layer is capable of conducting protons in unhydrated form. In some embodiments, the inorganic layer is electrically conductive.

The inorganic layer can comprise one or more inorganic materials, in free or hydrated form, selected from the group comprising vanadium oxide, tungsten oxide, ruthenium oxide, manganese oxide, tin oxide, zirconium oxide, titanium oxide, tantalum oxide, hafnium oxide, niobium oxide, and molybdenum oxide. In certain embodiments, the inorganic layer comprises tungsten oxide. In certain embodiments, the inorganic layer comprises zirconium phosphate.

The proton-exchange membrane can be fluorinated. The proton-exchange membrane can include one or more polymers selected from the group consisting of perfluorinated sulphonic acid polymers, modified perfluorinated sulfonic acid polymers, and polyhydrocarbon sulfonic acid polymers. In certain embodiments, the proton-exchange membrane consists essentially of Nafion.

The inorganic layer can have a thickness selected from about 10 nm to about 250 µm, such as about 0.1-100 µm. Preferably, although not necessarily, the inorganic layer is substantially uniform with respect to thickness.

With respect to the method of fabricating a composite membrane structure, the coating step can include dip coating or spray coating. The liquid solution can include a wetting agent, such as an anionic or nonionic surfactant. In some embodiments, the surfactant contains hydrophilic polyethylene oxide. In certain embodiments, the surfactant is Triton X-100. In some embodiments, the wetting agent comprises a fluorosurfactant, such as Zonyl FSN. Wetting agents allow modification of surface tension across the interface between the proton-exchange membrane and the inorganic layer as it is being formed.

In some embodiments, the liquid solution contains a non-zero amount of hydrogen peroxide, such as at least 0.05 wt % hydrogen peroxide.

Some variations of the present invention provide a method of fabricating a composite membrane structure containing a proton-conducting inorganic layer and an organic proton-exchange membrane, the method comprising:

(a) combining a metal and hydrogen peroxide into a starting solution, optionally with removal of heat;

(b) substantially neutralizing the hydrogen peroxide, thereby generating a neutralized solution;

(c) adding an effective amount of a wetting agent to the neutralized solution;

(d) disposing at least some of the solution from step (c) onto one face of the proton-exchange membrane, thereby generating a coating; and (e) curing the coating from step (d) at an effective temperature, thereby forming the inorganic layer.

The inorganic layer is preferably substantially continuous and uniform with respect to the proton-exchange membrane. In some embodiments, the method does not include substantial chemical modification of the proton-exchange membrane itself. The inorganic layer generally has a thickness selected from about 10 nm to about 250 µm, such as about 0.1-100 µm.

In some embodiments, the coating step (d) includes dip coating or spray coating. In some embodiments, the wetting agent is an anionic or nonionic surfactant, such as Triton X-100. In some embodiments, the wetting agent is a fluorosurfactant.

The neutralized solution produced in step (b) can contain a non-zero amount of hydrogen peroxide, such as at least 0.05 wt % hydrogen peroxide. In other embodiments, the neutralized solution produced in step (b) does not contain any measurable quantities of hydrogen peroxide.

In some embodiments, the methods further comprise fabricating a fuel cell including the composite membrane structure, an anode, and a cathode. In certain embodiments, the fuel cell configured to feed a liquid fuel. The liquid fuel can be selected from the group consisting of methanol, ethanol, 1-propanol, isopropanol, 1,3-propanediol, 2,4-pentanediol, formic acid, hydrocarbazole, and ethyl-hydrocarbazole. Preferably, the inorganic layer is not substantially permeable to the liquid fuel.

In preferred embodiments, fuel crossover within the proton exchange membrane is reduced, compared to an otherwise-identical fuel cell that does not contain the inorganic layer.

Other variations of this invention provide a composite membrane structure, the structure produced by a process comprising a coating step to deposit a proton-conducting inorganic layer on an organic proton-exchange membrane.

The inorganic layer is preferably substantially continuous with respect to the proton-exchange membrane. Optionally, the proton-exchange membrane is not substantially chemically modified during the process. In some embodiments, the proton-exchange membrane can be chemically modified, if desired.

In the composite membrane structure of these variations of the invention, the inorganic layer has a thickness selected from about 10 nm to about 250 µm, such as from about 0.1-100 µm. It can be preferred for the inorganic layer to be substantially uniform in thickness.

Other variations of this invention provide a composite membrane structure including a proton-conducting inorganic layer and an organic proton-exchange membrane, the structure produced by a process comprising:

(a) combining a metal and hydrogen peroxide into a starting solution, optionally with removal of heat;

(b) substantially neutralizing the hydrogen peroxide, thereby generating a neutralized solution;

(c) adding an effective amount of a wetting agent to the neutralized solution;

(d) disposing at least some of the solution from step (c) onto one face of the proton-exchange membrane, thereby generating a coating; and (e) curing the coating from step (d) at an effective temperature, thereby forming the inorganic layer.

Still other variations of the invention relate to a fuel cell comprising (i) the composite membrane structure described in the foregoing variations, (ii) an anode, and (iii) a cathode. The inorganic layer is preferably not substantially permeable to the liquid fuel.

In preferred embodiments when a liquid fuel is used, crossover of the liquid fuel within the proton exchange membrane is reduced, compared to an otherwise-identical fuel cell that does not contain the inorganic layer.

In preferred embodiments, electrical power output of the fuel cell is at least two times the electrical power output of an otherwise-identical fuel cell that does not contain the inorganic layer. In various embodiments, the enhancement in electrical power output resulting solely from the addition of the inorganic layer is a factor of about 1.1, 1.25, 1.5, 1.75, 2.0, 2.25, 2.5, or more.

DETAILED DESCRIPTION OF EMBODIMENTS OF THE INVENTION

The systems and methods of the present invention will now be described in detail by reference to various non-limiting embodiments of the invention.

Unless otherwise indicated, all numbers expressing dimensions, conductivities, and so forth used in the specification and claims are to be understood as being modified in all instances by the term "about." Without limiting the application of the doctrine of equivalents to the scope of the claims, each numerical parameter should at least be construed in light of the number of significant digits and by applying ordinary rounding techniques.

Certain preferred embodiments of the present invention will now be described in more detail, including reference to the accompanying figures. The figures provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein.

The main components of a conventional proton exchange membrane (PEM) fuel cell are the PEM layer, sandwiched between gas diffusion layers and catalyst layers on each of the anode and cathode sides. The present invention is premised, at least in part, on the discovery that an additional layer can be introduced between the PEM layer and the anode catalyst layer, wherein the additional layer is selected or designed to be suitable for limiting fuel crossover. Fuel that leaks across the membrane can be oxidized by oxygen or another oxidant in the cathode without producing electrons, thereby reducing the power output of the fuel cell.

In some variations, a fuel cell of the invention includes an inorganic, continuous barrier that is substantially (preferably completely) disposed adjacent to, or coated onto, the PEM on the anode side. The inorganic layer should be capable of conducting protons from the anode catalyst layer into the PEM. The inorganic layer can serve one more additional functions, in various embodiments, including: (a) limiting the contact of the fuel and the PEM; (b) reducing fuel crossover, both from diffusion and electro-osmotic drag; (c) maintaining cell potential; and (d) increasing fuel compatibility with the PEM.

Figure 1:
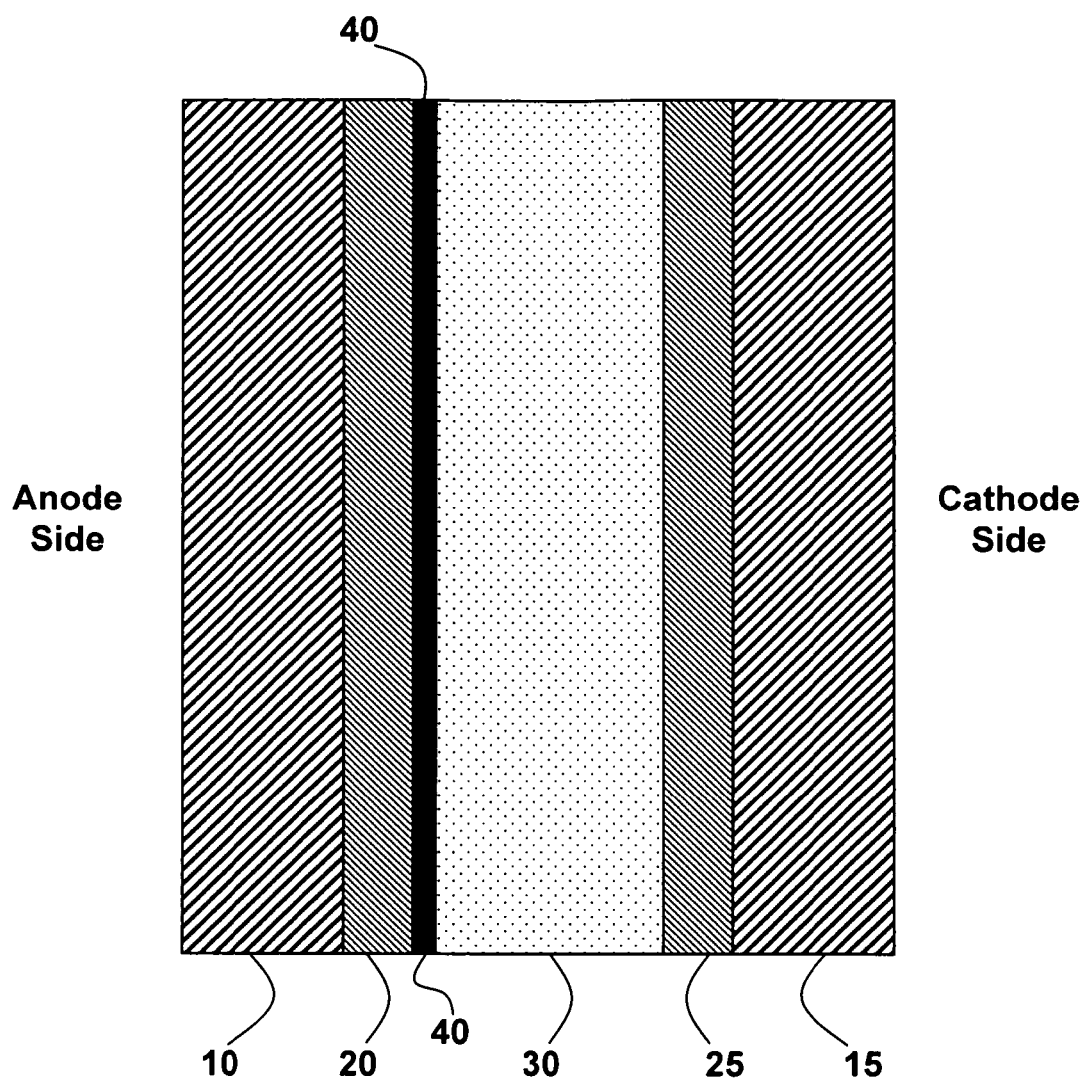
FIG. 1 is a schematic illustration of the cross section of a membrane electrode assembly provided in some variations of the invention.

Some variations can be described by reference to FIG. 1, which is a schematic illustration (not drawn to scale) of the cross section of a membrane electrode assembly within a fuel cell. In FIG. 1, a membrane electrode assembly comprises a PEM 30, two gas diffusion layers (10, 15), and two catalyst layers (20, 25). The anode side includes gas-diffusion layer 10 and anode catalyst layer 20. The cathode side includes gas-diffusion layer 15 and cathode catalyst layer 25. A continuous inorganic proton-conduction barrier layer 40 is situated between the PEM 30 and the anode catalyst layer 20.

The inorganic layer 40 can create a barrier between the anode catalyst layer 20 and the proton exchange membrane 30, while transferring protons formed in the anode catalyst layer 20 into the PEM 30 for conduction to the cathode catalyst layer 25. The inorganic layer 40 has a first interface adjacent to the anode catalyst layer 20 and a second interface adjacent to the PEM 30, as depicted in FIG. 1.

The mechanism for proton transport across the inorganic layer 40 can vary, depending on the specific inorganic material employed, but it will preferably not be dominated by hydrated-proton transport (as $H_3O^+$ or another form of water-solvated proton). Without being limited by any particular hypothesis, protons can be transported within the inorganic layer 40 by one or more of Fickian (concentration gradient) diffusion, migration of adsorbed surface species, reaction-facilitated diffusion, or other mechanisms involving unhydrated $H^+$. The inorganic layer 40 is preferably solid, but it can also be a viscous liquid or a multiphase material, in some embodiments.

In preferred embodiments, the inorganic layer 40 is "non-porous," which for present purposes is intended to mean that the layer is permeable to protons but not substantially permeable to the fuel. The inorganic layer 40 will therefore have non-zero proton conductivity, but the layer need not have high proton conductivity. The proton conductivity of the inorganic layer 40 can be less than the proton conductivity of the PEM 30. In some embodiments, the inorganic layer 40 can also be electrically conductive, to some extent. An electrically conducting inorganic layer 40 is allowable because it is electrically isolated from the cathode by the PEM 30, which prevents an electrical short circuit.

In preferred embodiments, the inorganic layer 40 is substantially inert with respect to the fuel. If the inorganic layer 40 is reactive in the presence of the fuel, the stability or fuel-cell performance over time may suffer. By "substantially inert," it is meant that the inorganic layer 40 preferably does not react at all with the fuel, or that it can maintain an acceptable reaction equilibrium with the fuel. An acceptable reaction equilibrium means that although there may be some small amount of surface modification (caused by the fuel) to the inorganic material, the function of the inorganic layer 40 can persist at steady state or over repeated cycling of the fuel cell. The bulk of the inorganic layer 40 preferably does not change its nominal chemical composition, structure, or phase in the presence of fuel.

In preferred embodiments, the inorganic layer 40 is formed or present in substantially continuous form. By "substantially continuous" it is meant that the inorganic layer 40 substantially covers the PEM 30, i.e. there are few discontinuities (holes, gaps, etc.) in the inorganic layer 40. Substantial coverage of the PEM 30 means that at least 90%, preferably at least 95%, and more preferably at least 99% of the surface area of the membrane, on the anode side, is covered by the inorganic layer 40. In some embodiments, all of the PEM 30 anode-side surface area is covered by the inorganic layer 40.

It will be recognized that even if the inorganic layer 40 is not continuous, some benefit can result. As such, in some embodiments, less than 90% (e.g., 50% or 75%) of the surface area of the membrane, on the anode side, is physically adjacent to the inorganic layer 40. Also, if a portion of the PEM 30 is not part of the chemical path within the fuel cell, then the inorganic layer 40 need not form a continuous interface with that portion of the membrane.

The thickness of the inorganic layer 40 can vary, but it is preferably sufficiently thin to maintain an adequate ionic conductivity of the fuel cell. Ionic conductivity depends on composition, so the thickness of the inorganic layer 40 can vary depending on its selected composition. In some embodiments, the thickness of the inorganic layer 40 ranges from about 10 nm to about 100 µm (i.e., about $10^{-8}$ to $10^{-4}$ m). In certain embodiments, the thickness ranges from about 200 nm to about 10 µm (i.e., about $2 \times 10^{-7}$ to $10^{-5}$ m).

Preferably, the thickness of the inorganic layer 40 is substantially uniform across the layer. "Substantially uniform" in this context is intended to mean that the relative standard deviation in layer thickness is less than 25%, preferably less than 10%, and more preferably less than 5%. For this definition, the standard deviation is one standard deviation ($\pm\sigma$) from the mean thickness of the inorganic layer 40. As will be appreciated, non-uniform layer thicknesses (with relative standard deviations in excess of 25%) can certainly be employed and can be effective, but are less preferred.

The inorganic layer 40 can include any proton-conducting metal oxide. In some embodiments, the inorganic layer 40 comprises one or more inorganic materials, in free or hydrated form, selected from the group consisting of vanadium oxide, tungsten oxide, ruthenium oxide, manganese oxide, tin oxide, zirconium oxide, titanium oxide, tantalum oxide, hafnium oxide, niobium oxide, and molybdenum oxide.

One potential inorganic material for the inorganic layer 40 is vanadium oxide, which can be in the form of, for example, $VO$, $VO_2$, $V_2O_3$, $V_2O_5$, $V_2O_7$, $V_3O_7$, and/or any of the foregoing in hydrate form, such as $V_2O_5 \cdot xH_2O$ (vanadium pentoxide hydrate, x>0). The proton conductivity of a vanadium oxide layer is on the order of $10^{-3}$ ($\Omega^{-1}$ cm$^{-1}$). Although this proton conductivity is less than that of a typical sufficiently hydrated PEM 30, the inorganic layer 40 is preferably much thinner than the PEM 30. Thus, the overall ionic conductance of the fuel cell is not significantly impacted by the addition of the inorganic layer 40.

Another potential inorganic material for the inorganic layer 40 is tungsten oxide, which can be in the form of, for example, $WO_2$, $WO_3$, $W_2O_3$, and any hydrate or reduced forms, such as $H_2WO_3$, $H_2WO_4$, $H_4WO_4$, etc. The proton conductivity of tungsten oxide is similar to that of vanadium oxide and has the added advantage of excellent chemical stability when exposed to the chemical species present during operation of the fuel cell.

The inorganic layer 40 can include a proton-conducting metal acid. In some embodiments, the inorganic layer 40 includes one or more sulfate acids of the form $XHSO_4$ or phosphate acids of the form $XH_2PO_4$, wherein X is selected from the group consisting of Li, Na, K, Rb, Cs, Ce, and $NH_4$. In some embodiments, the inorganic layer 40 includes $ZrPO_4$.

The gas-diffusion layer 10 and/or 15 can be of various thicknesses and compositions. In some embodiments, Toray® carbon paper, with a thickness in the range of 0.1-0.4 mm, is used to distribute the fuel evenly over the anode catalyst layer 20.

An anode catalyst (in layer 20) according to some embodiments is one selected from platinum (Pt), platinum-tin (Pt—Sn), and/or platinum-ruthenium (Pt—Ru), any of which can be supported (e.g., on carbon) or unsupported, and optionally mixed with a binder. The anode catalyst can include other platinum-group metals, such as palladium or rhodium, and can be present in free or combined form, such as in metal alloys, oxides, carbides, etc. For example, an anode catalyst layer 20 can be cast from a mixture of isopropanol and platinum, using a Teflon® slurry.

A cathode catalyst (in layer 25) according to some embodiments is one selected from Pt, Pt—Sn, and/or Pt—Ru (optionally supported on carbon, and optionally mixed with a binder). The cathode catalyst can include other platinum-group metals, such as palladium or rhodium, and can be present in free or combined form, such as in metal alloys, oxides, carbides, etc.

The PEM 30 can be any class of proton-conducting polymers, such as (but not limited to) perfluorinated sulphonic acid, polyhydrocarbon sulfonic acid, or composites thereof. In preferred embodiments, Nafion is used. Nafion is known to possess good thermal and mechanical stability. Nafion's ionic properties result from incorporating perfluorovinyl ether groups terminated with sulfonate groups onto a tetrafluoroethylene backbone. A chemically or physically modified Nafion material can be employed for the PEM 30, as well. Another exemplary proton-conducting polymer is polybenzimidazole, suitably functionalized (e.g., alkylation with a phosphonate) for use as a membrane.

A preferred method of forming the inorganic layer 40 is to utilize a sol-gel process to coat the selected material onto the PEM 30. However, fluorinated PEM polymer materials are known to be difficult to wet using aqueous or organic solutions. Other non-fluorinated membranes are also hydrophobic and difficult to wet. These properties make it challenging to produce a coating (layer 40 on PEM 30) that is substantially continuous and uniform, as is typically desired. Poor wetting can result in sporadic coverage of the coating on the membrane, thereby leading to increased fuel crossover.

Some variations of the present invention are premised on the discovery that properly selected wetting agents can assist in producing substantially continuous and uniform inorganic coatings on organic membranes (e.g., Nafion). This discovery, combined with subsequent experimentation and method optimization, forms a part of the present invention.

In some variations, a solution containing a selected inorganic material, such as tungsten oxide, can be prepared by combining metal powder, such as tungsten powder, with a solution of water and hydrogen peroxide (or another suitable peroxide species, such as an organic peroxide). The oxide formation is typically exothermic. To avoid excessive heat generation, the metal powder can be slowly added to the solution and/or a source of heat removal (e.g., a low-temperature heat sink) can be employed.

The hydrogen peroxide (or other peroxide) contained in the metal oxide solution is preferably neutralized, at least to some extent. Various methods of $H_2O_2$ neutralization can be used, such as by exposing the solution to a platinum catalyst at an effective temperature, e.g. from about 50-100° C., for an effective time, e.g. from about 10-60 minutes. Another approach to $H_2O_2$ neutralization is to expose the peroxide to an alkaline environment, such as calcium oxide. $H_2O_2$ can also be decomposed using a suitable enzyme. $H_2O_2$ should be substantially neutralized to avoid undesirable side reactions caused by $H_2O_2$ and to avoid gas evolution during curing. Gas evolution tends to reduce the final density of the inorganic layer 40.

Without limitation of the present invention, it has been found that while hydrogen peroxide (or another suitable peroxide) should be substantially neutralized, a small but non-zero amount of $H_2O_2$ can optionally be left in the solution. In some embodiments, there remains a certain amount of $H_2O_2$ after the neutralization step, such as at least 0.01 wt %, 0.05 wt %, 0.1 wt %, or more $H_2O_2$ in the solution.

A wetting agent is then preferably introduced into the metal oxide solution (sol). A wetting agent can generally lower the interfacial surface tension between two liquids or phases. In preferred embodiments of this invention, a wetting agent enhances the ultimate continuity and uniformity of the inorganic layer 40 on the PEM 30. The wetting agent in preferred embodiments of the invention is a surfactant, such as Triton X-100, which is a known nonionic surfactant containing hydrophilic polyethylene oxide.

In some embodiments, a fluorinated surfactant can be used, such as when the PEM material is itself fluorinated. Fluorinated surfactants can reduce surface tension more effectively than hydrocarbon or silicone surfactants, leading to better disposing (i.e., better leveling, wetting, or spreading). Fluorinated surfactants can be selected from, for example, DuPont (Delaware, U.S.) Zonyl® Fluorosurfactants, such as Zonyl FSN.

Other nonionic surfactants that can be used include, but are not limited to, alkyl poly(ethylene oxide), alkylphenol poly (ethylene oxide), poloxamers, poloxamines, alkyl polyglucosides, fatty alcohols, cocamide MEA, cocamide DEA, Tween 20, and Tween 80. Anionic surfactants that can be used include those based on sulfate, sulfonate or carboxylate anions. Exemplary anionic surfactants are perfluorooctanoate, perfluorooctanesulfonate, sodium dodecyl sulfate, ammonium lauryl sulfate, sodium laureth sulfate, alkyl benzene sulfonate, and fatty acid salts. Zwitterionic surfactants can also be used, such as dodecyl betaine, cocamidopropyl betaine, or coco ampho glycinate.

The amount of wetting agent can vary, depending on the surfactant properties of the selected wetting agent and on the solubility of the wetting agent in the sol. Also, the selected inorganic material can influence preferred amounts of wetting agent. For example, a wetting agent can be added to the metal oxide sol in an amount of about 0.1 wt %, 0.5 wt %, 1 wt %, 2 wt %, 5 wt %, or higher. The wetting agent should be substantially dissolved into the metal oxide sol.

The coating step can employ a solution that is in one or more phases, i.e. liquid, vapor, multiphase (e.g., liquid/liquid or liquid/vapor), dissolved solids, etc. In preferred but non-limiting embodiments, the coating is deposited from a liquid solution.

The metal oxide sol can be disposed onto a face (i.e., outer surface) of the PEM substrate by dip coating, spin coating, spray coating, etc. In some variations, the PEM substrate is first boiled in water (e.g., deionized water), and optionally then boiled in a dilute acid (e.g., 0.1 M HCl) for period of time. The coated PEM substrate can then be subjected to heat, such as in an oven, and allowed to cure for an effective time and temperature. For example, curing can be accomplished at temperatures selected from about 50-150° C. for times selected from about 10 minutes to about 24 hours or more.

The coated and cured PEM substrate can be subjected to any number of additional steps comprising coating the metal oxide sol followed by intermediate curing, if desired. Multiple coatings, such as 2, 3, 4, 5 or more coatings, can be beneficial in various embodiments wherein a thicker overall inorganic layer 40 is desired for reduction of fuel crossover. Curing the membrane between coating steps results in a material that is less susceptible to being dissolved during additional coating steps.

The fuel cell provided by the invention is suitable for a wide variety of fuels, and is not limited to any particular class of fuels, although liquid fuels are preferred in some variations. An exemplary list of fuels is hydrogen, syngas, methanol, ethanol, 1-propanol, isopropanol, 1,3-propanediol, 2,4-pentanediol, formic acid, hydrocarbazole, and alkylated hydrocarbazole (e.g., ethyl-hydrocarbazole). Essentially any hydrocarbons, including oxygenates, alkanes, olefins, aromatics, and heterocyclic compounds, can be employed. Generally, the inorganic layer 40 can be designed with a single fuel in mind, or it can be tailored for maximum effectiveness for multiple fuels.

In some embodiments, a selected PEM 30 is not substantially chemically or physically modified, in bulk, as part of the method for forming the inorganic layer 40. Some embodiments modify the interface between the PEM 30 and the inorganic layer 40, e.g. when wetting agents are employed during formation of the inorganic layer 40 to modify interfacial surface tension (or energy).

It is believed that the presence of the inorganic layer 40 can broaden the selection for the PEM 30, which need not be compatible with a selected fuel when, as in preferred embodiments, fuel crossover is reduced. The inorganic layer 40 can be varied without changing the PEM 30 to provide stability and compatibility with a desired fuel.

For example, ethyl-hydrocarbazole is known to be incompatible with many PEM materials, such as Nafion. The addition of a suitable inorganic layer 40 enables the utilization of ethyl-hydrocarbazole fuel without PEM chemical modifications.

Preferred embodiments of the invention provide for reduced fuel crossover due to electro-osmotic drag. Electro-osmotic drag results from the movement of liquid fuels (e.g., methanol) with hydronium ions across the membrane, in response to the concentration gradient across a PEM. This phenomenon can drastically reduce the amount of fuel that can be fed to a fuel cell. The inorganic layer 40 can reduce, and even eliminate, electro-osmotic drag because proton conduction through the inorganic material does not rely on unbound water. With electro-osmotic drag reduced or absent, the allowable feed amount or concentration of fuel can be increased, thereby improving the performance (e.g., power output and/or efficiency) of the fuel cell. Preferred embodiments of this invention therefore can avoid the use of highly dilute fuels in water. Also, certain fuel cells, such as direct-methanol fuel cells, can operate at higher temperatures when electro-osmotic drag is reduced, further enhancing performance.

Figure 2:
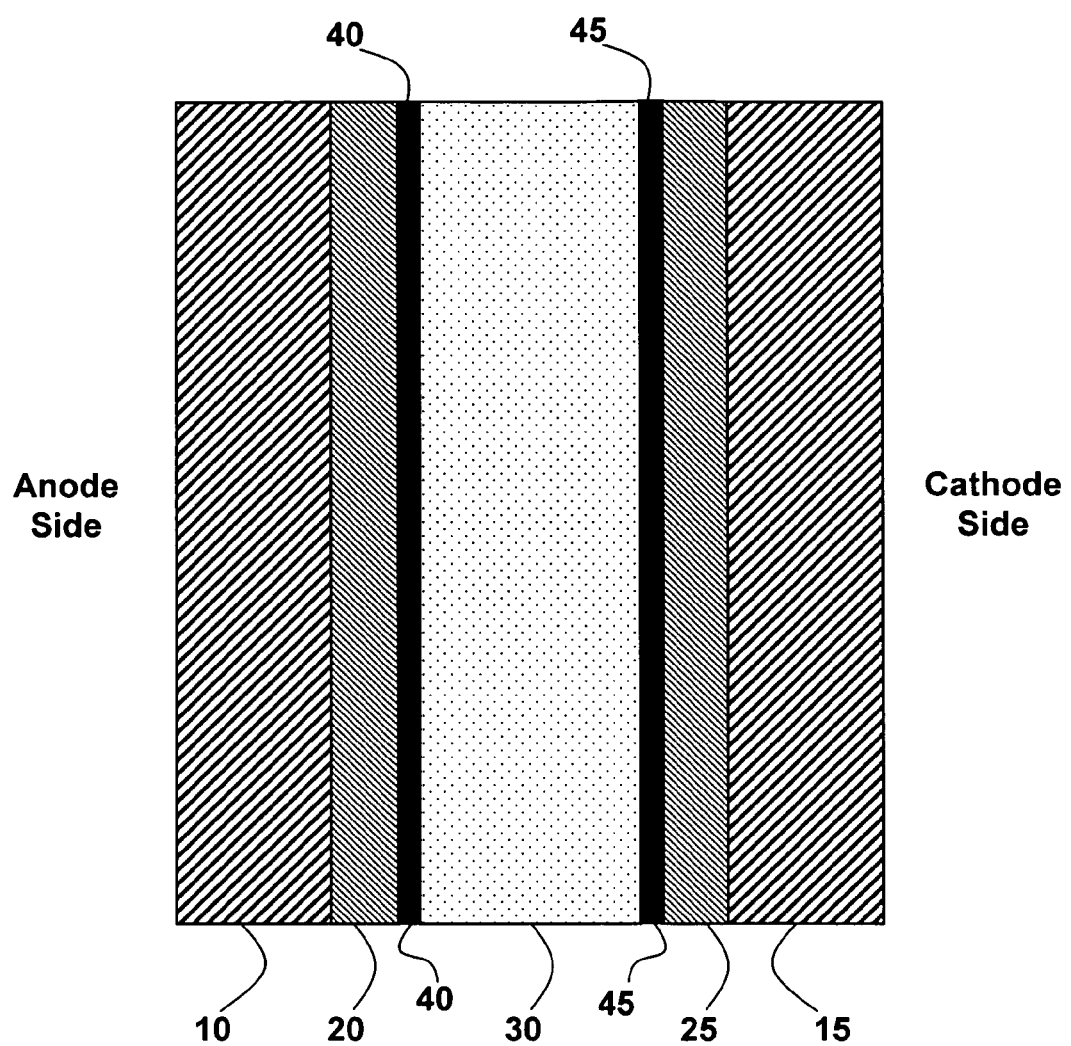
FIG. 2 is a schematic illustration of the cross section of a membrane electrode assembly provided in other variations of the invention.

A variation of this invention can be described by reference to FIG. 2. This schematic illustration (not drawn to scale) shows the cross section of a membrane electrode assembly within a fuel cell. In FIG. 2, a membrane electrode assembly comprises a PEM 30, two gas diffusion layers (10, 15), and two catalyst layers (20, 25). The anode side includes gas-diffusion layer 10 and anode catalyst layer 20. The cathode side includes gas-diffusion layer 15 and cathode catalyst layer 25. A continuous inorganic proton-conduction barrier layer 40 is situated between the PEM 30 and the anode catalyst layer 20. Additionally, a second continuous inorganic proton-conduction barrier layer 45 is situated between the PEM 30 and the cathode catalyst layer 25. The second inorganic layer 45, on the cathode side, can reduce back-diffusion.

All variations, options, embodiments, and discussion with respect to FIG. 1 herein above are incorporated by reference into this description of FIG. 2. Namely, each of the inorganic layers 40 and 45 in FIG. 2 can be separately and independently engineered or selected, and by no means to these layers need with respect to composition, thickness, method of formation, etc.

Other variations of the invention include multiple (i.e., at least two) PEM layers and multiple inorganic layers. Each PEM layer can have at least one interface with an inorganic layer. In these variations, all PEM layers and inorganic layers can be independently selected. These multilayer variations can, in some embodiments, expand the useful temperature range of a fuel cell.

Still another variation of the invention provides for the addition of an inorganic layer (or layers) to an existing fuel cell, whether new or used. An existing fuel cell can be partially deconstructed and an inorganic layer (such as inorganic layer 40) then introduced according to the sol-gel process described herein, or by another known means, to produce an improved fuel cell of the invention.

Certain method variations described herein can produce composite membrane structures and fuel cells in accordance with those described in co-pending and commonly assigned patent application Ser. No. 12/420,044 (filed Apr. 7, 2009), which application is hereby incorporated by reference herein for all purposes.

EXAMPLE 1

This Example 1 discloses the formation of a tungsten oxide-coated fuel-cell membrane.

Nafion is prepared by receiving 0.180-mm-thick Nafion from Alfa Aesar (Ward Hill, Mass., U.S.), cutting the Nafion into 4"×4" squares, boiling the Nafion in deionized water for one hour and then boiling the Nafion in 0.1 M HCl for one hour. Then the Nafion squares are removed from the HCl solution, washed with deionized water, and stored in a deionized water bath.

A tungsten oxide sol is prepared by first making a solution of 24 g 50 wt % $H_2O_2$ and 28 g deionized $H_2O$. The solution is stirred rapidly and 8 g of W powder is slowly added over two hours. The reaction between hydrogen peroxide and tungsten is very exothermic. When the solution begins to boil, it is placed in a room-temperature water bath while being stirred.

The hydrogen peroxide in the tungsten oxide sol is then neutralized by placing a platinum mesh in the solution and putting the solution in an 80° C. oven for 25 minutes. Then the Pt mesh is removed and the solution is cooled to room temperature.

A wetting agent is next placed in the tungsten oxide sol. The solution is weighed and an amount of Triton X-100 equivalent to 1 wt % of the solution is added. The solution is stirred to dissolve all of the surfactant, resulting in a yellow solution. The sol is transferred to a 6" diameter glass Petri dish.

A Nafion square is floated on the tungsten oxide sol in the Petri dish and pulled out of the solution to create a dip coat of tungsten oxide sol on one side of the Nafion material. The coated Nafion sheet is transferred to an 80° C. oven and allowed to cure for about one hour.

The coated Nafion sheet is then removed from the oven, washed with deionized water, and floated on the tungsten oxide sol with the coated side in the solution. The Nafion is pulled out of the solution to create an additional dip coat of tungsten oxide sol on the same side of the Nafion that was previously coated. If any tungsten oxide sol remains on the uncoated side of the Nafion, it is washed off with deionized water. The coated Nafion sheet is transferred to an 80° C. oven and allowed to cure for about one hour. This step is repeated two more times so that a total of four coatings of tungsten oxide are applied onto the fuel-cell membrane.

EXAMPLE 2

This Example 2 describes the results of testing a tungsten oxide-coated fuel-cell membrane fabricated according to Example 1.

The membrane is tested in a direct methanol fuel cell. DMFC membranes are made using electrodes produced by E-TEK (BASF Fuel Cell GmbH, Frankfurt, Germany), unsupported High Power (HP) Pt:Ru (1:1) alloy black 5.0 mg/cm$^2$ loading for the anode and unsupported HP Pt black 5.0 mg/cm$^2$ loading for the cathode. The tungsten oxide-coated Nafion is hydrated for about 10 minutes in deionized water. Then a 1"×1" anode is placed on the tungsten oxide-coated side of the Nafion and a 1"×1" cathode is placed on the opposite side. The DMFC membrane stack is pressed together in a 150° C. heated press for 5 minutes between 31 mil shims (intended to limit the maximum compression during pressing). Then the heated press is water-cooled to 50° C. and the pressure is released.

A fuel cell membrane electrode assembly is assembled under 15 inch-pounds of pressure in a FC-05-02 PEM fuel cell with 5 cm$^2$ electrode area, purchased from Fuel Cell Store (San Diego, Calif., U.S.).

EXAMPLE 3

The fuel cell membrane electrode assembly provided according to Example 2 is tested in this Example 3. Fuel cell performance is evaluated using a Solartron (Farnborough, Hampshire, U.K.) SI 1287 Electrochemical Interface.

Figure 3:
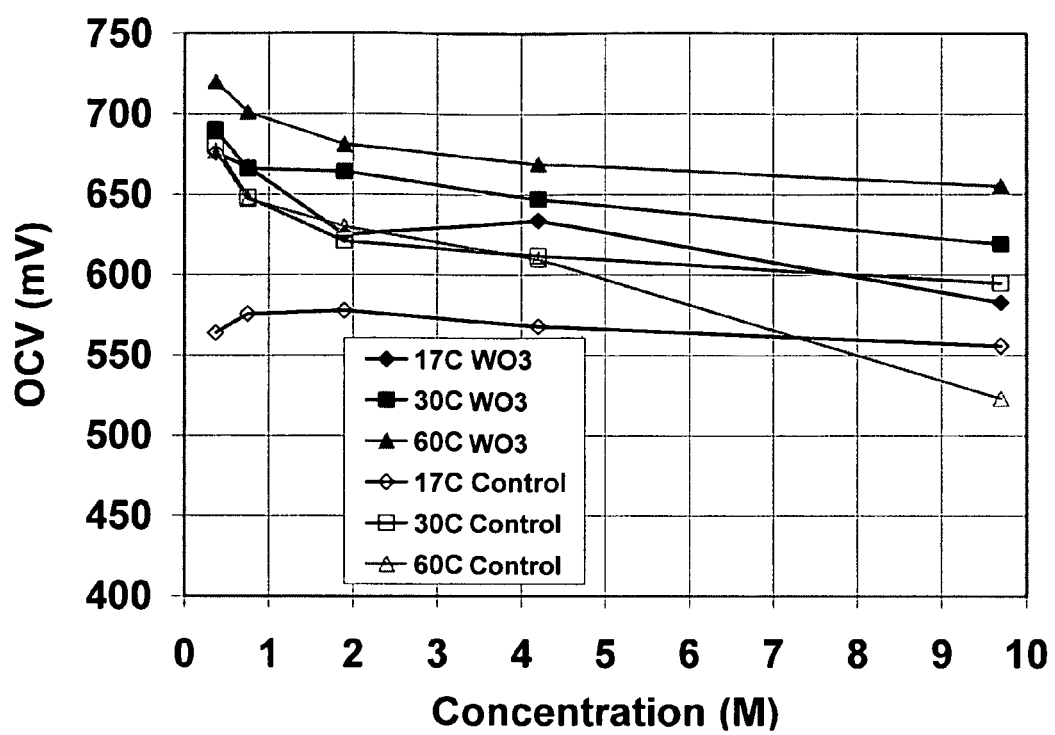
FIG. 3 demonstrates the open-current voltage of a direct-methanol fuel cell with and without an organic layer, as a function of methanol concentration and for different temperatures, according to some embodiments.

Methanol flow is provided at 1 mL/min and humidified oxygen flow is provided at 164-215 mL/min. The results of the electrochemical testing demonstrate the performance benefit provided by the tungsten oxide coating. FIG. 3, which plots the fuel-cell open circuit voltage (OCV) versus methanol concentration, shows the difference in OCV operating with and without the tungsten oxide coating. The OCV represents the fuel cell output voltage when no current load is connected to the fuel cell apparatus.

The additional tungsten oxide inorganic layer provides a large advantage over the control (uncoated Nafion), particularly at elevated temperatures and high methanol concentrations. The higher OCV indicates a reduction in fuel crossover achieved with the modified membrane, resulting from the decreased ability of methanol to permeate the membrane.

Figure 4:
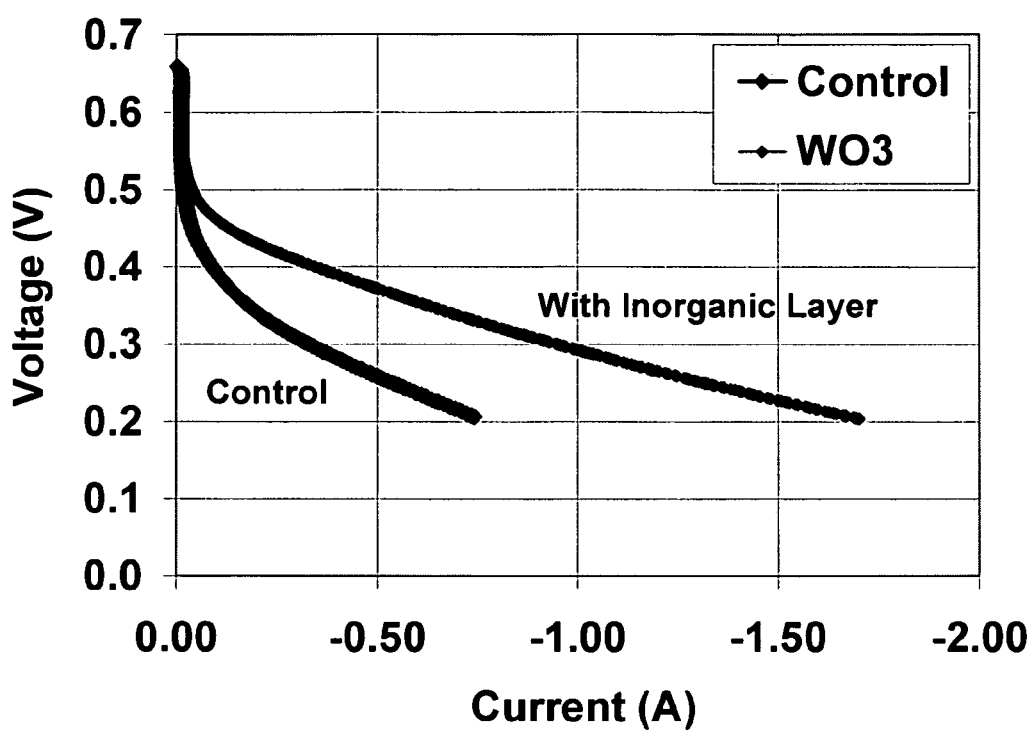
FIG. 4 shows a fuel cell polarization curve at 60° C. of a direct-methanol fuel cell (9.7 M methanol) with and without an organic layer of the invention.
Figure 5:
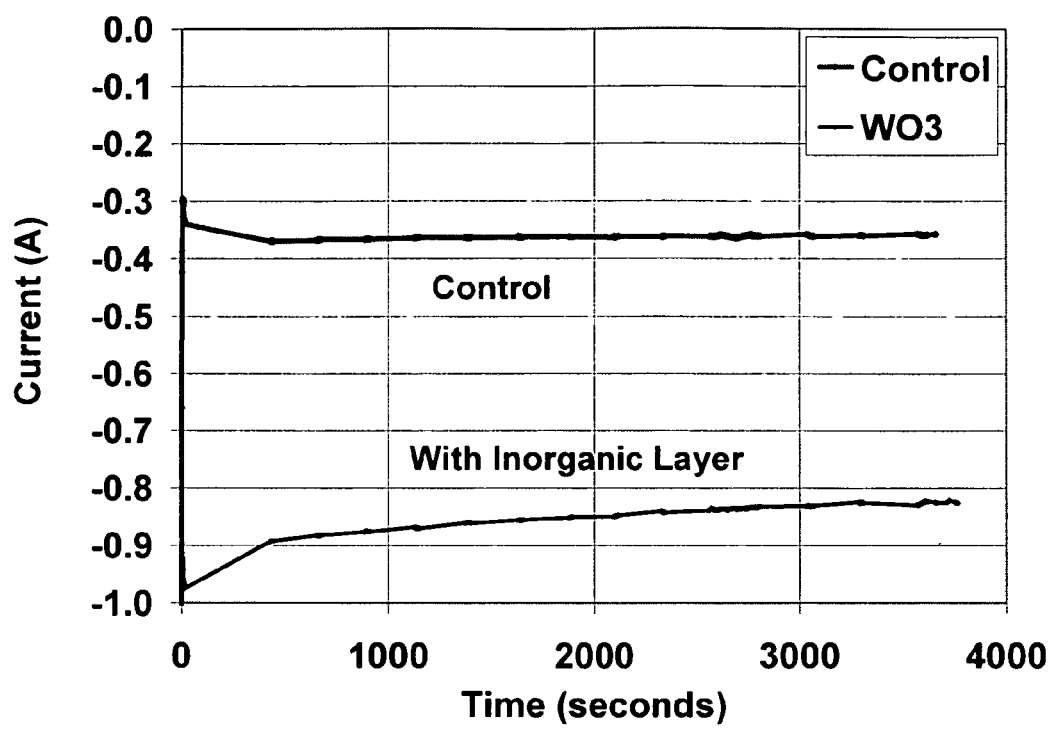
FIG. 5 depicts the current output (at 0.3 V and 60° C.) of a direct-methanol fuel cell (9.7 M methanol) with and without an organic layer of the invention.

The difference in power output between a fuel cell using the modified membrane versus the control is shown in FIGS. 4 and 5. A 9.7 M methanol solution is provided at 60° C. to the anode at 1 mL/min and humidified oxygen flowing at the cathode at a rate of 215 mL/min, to generate a fuel cell polarization curve as depicted in FIG. 4. At a potential of 0.3 V, the fuel cell current output is shown in FIG. 5 for a 9.7 M methanol solution flowing over the anode at 1 mL/min and humidified oxygen flowing at the cathode at a rate of 215 mL/min, at a temperature of 60° C.

The modified membrane achieves a power output greater than two times that of the unmodified Nafion membrane. The enhanced performance indicates a reduction in permeability and fuel crossover induced by osmotic drag. At potentials less than 0.5 V (FIG. 4), the current output of the modified membrane is greater than that of the Nafion membrane, and the difference increases as the voltage of the cell decreases. The increased power output is maintained for over an hour of operation (FIG. 5).

In the Nafion membrane, the protons must move across the membrane with water, which also carries fuel (methanol) across the membrane due to osmotic drag. As more current is drawn out of the cell, more protons are formed at the anode and thus fuel crossover due to osmotic drag is worse at lower potentials. The tungsten oxide barrier layer eliminates the need for a proton to be hydrated to traverse the modified membrane, and thereby reduces fuel crossover due to osmotic drag. The large difference in current at low potential demonstrates the efficacy of some variations of this invention.

Practical utility for this invention includes, but is not limited to, small power plants, electric and hybrid vehicles, auxiliary power, off-grid power supply, battery back-up power, notebook computers, and portable electronics. This invention can be used in aerospace and military applications (e.g., satellites).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, equations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of fabricating a composite membrane structure for a fuel cell, said method comprising depositing, from a liquid solution, a substantially continuous and non-porous proton-conducting inorganic oxide layer on an organic proton-exchange membrane comprising a proton-conducting polymer, wherein said inorganic oxide layer comprises at least one proton-conducting metal oxide; wherein said method comprises the steps of:
    (a) combining a metal and hydrogen peroxide into a starting solution, optionally with removal of heat arising from formation of said metal oxide in said starting solution;
    (b) substantially neutralizing said hydrogen peroxide in said starting solution, thereby generating a neutralized solution;
    (c) adding a wetting agent to said neutralized solution;
    (d) disposing at least some of said neutralized solution from step (c) onto one face of said organic proton-exchange membrane, thereby generating a coating; and
    (e) curing said coating from step (d) at a curing temperature, thereby forming said inorganic oxide layer.

2. The method of claim 1, wherein said proton-exchange membrane is completely covered by said inorganic oxide layer.

3. The method of claim 1, wherein said proton-conducting metal oxide is selected from the group consisting of vanadium oxide, tungsten oxide, ruthenium oxide, manganese oxide, tin oxide, zirconium oxide, titanium oxide, tantalum oxide, hafnium oxide, niobium oxide, molybdenum oxide, and any hydrated form thereof.

4. The method of claim 3, wherein said inorganic oxide layer comprises tungsten oxide.

5. The method of claim 1, wherein said inorganic oxide layer further comprises a proton-conducting metal acid.

6. The method of claim 1, said method further comprising disposing a catalyst layer onto said inorganic oxide layer such that said inorganic oxide layer is situated between said catalyst layer and said proton-exchange membrane.

7. The method of claim 1, wherein said inorganic oxide layer is capable of conducting protons in unhydrated form.

8. The method of claim 1, wherein said inorganic oxide layer is electrically conductive.

9. The method of claim 1, wherein said inorganic oxide layer has a thickness selected from about 10 nm to about 250 μm.

10. The method of claim 9, wherein said thickness is selected from about 0.1-100 μm.

11. The method of claim 1, wherein said inorganic oxide layer is substantially uniform with respect to thickness.

12. The method of claim 1, wherein said curing temperature in step (e) is selected from 50-150° C.

13. The method of claim 1, wherein said wetting agent is an anionic or nonionic surfactant.

14. The method of claim 13, wherein said surfactant contains hydrophilic polyethylene oxide.

15. The method of claim 14, wherein said surfactant is 4-(1,1,3,3-tetramethylbutyl)phenyl-polyethylene glycol.

16. The method of claim 1, wherein said wetting agent comprises a fluorosurfactant.

17. The method of claim 16, wherein said fluorosurfactant is poly(oxy-1,2-ethanediyl), α-hydro-ω-hydroxy-ether with α-fluoro-ω-(2-hydroxyethyl)poly(difluoromethylene).

18. The method of claim 1, wherein said neutralized solution contains at least 0.05 wt % hydrogen peroxide.

* * * * *